A. BALL AND T. OFFICER.
ROCK DRILL.
APPLICATION FILED AUG. 13, 1915.
1,304,523.
Patented May 20, 1919.
3 SHEETS—SHEET 1.
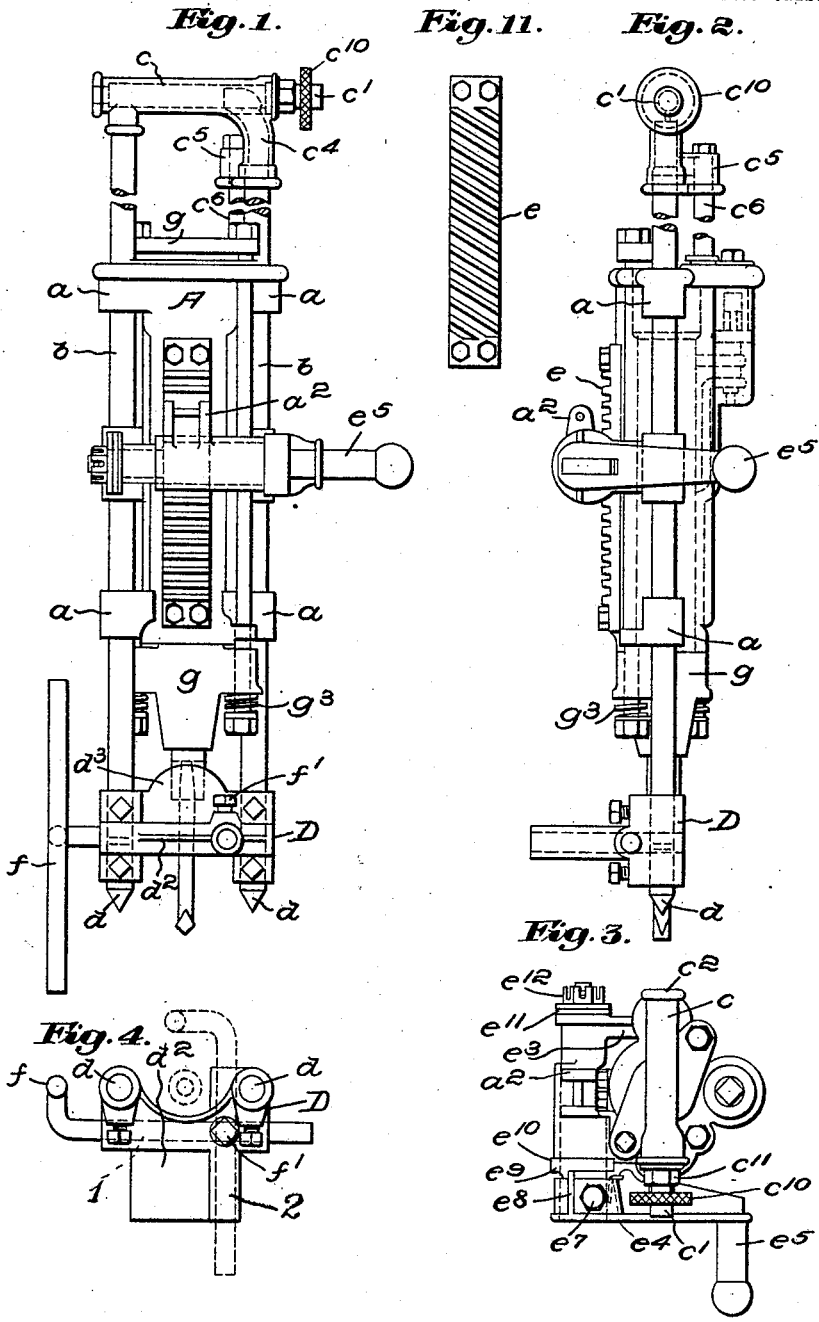
Inventors:
Albert Ball.
Thomas Officer,

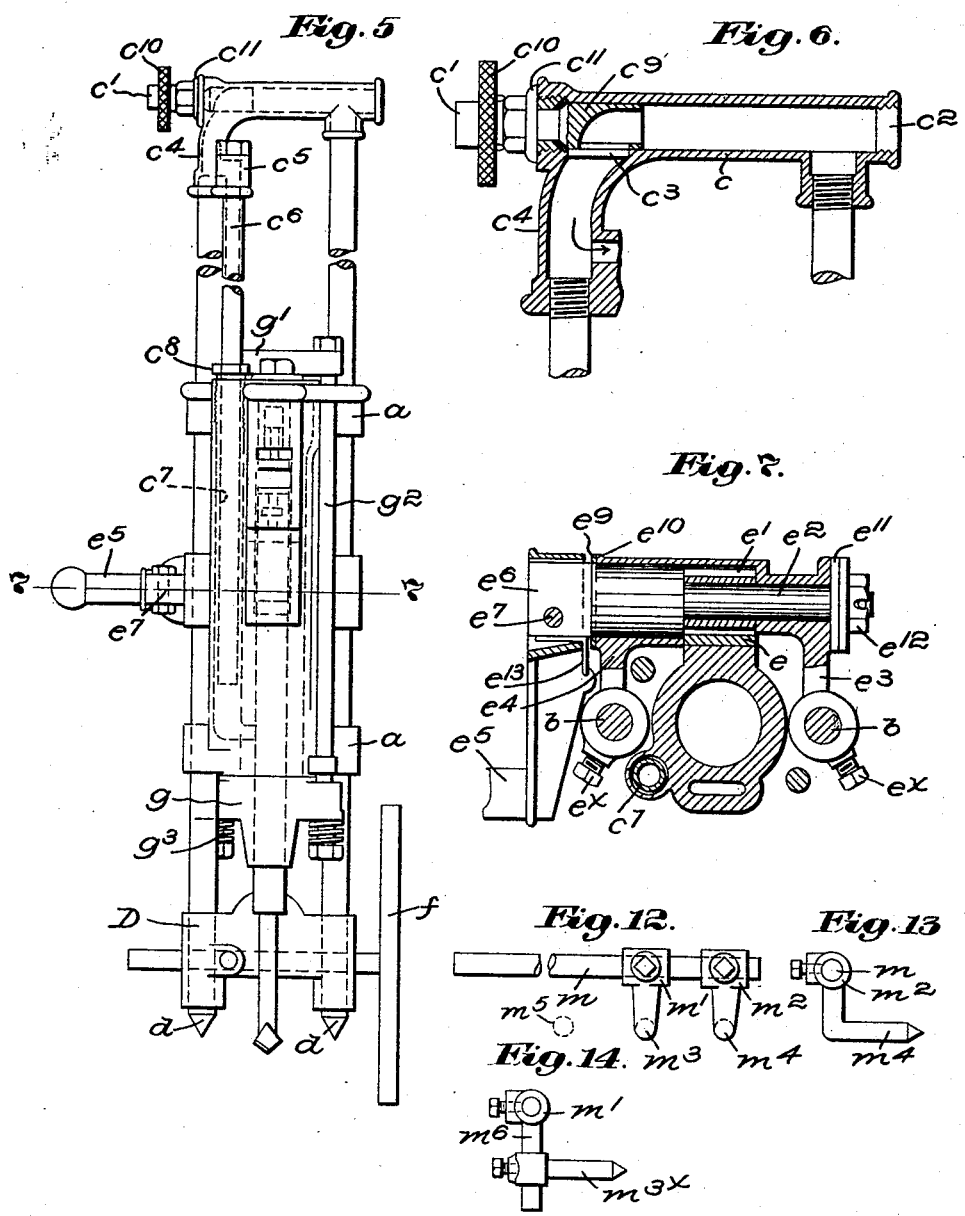

A. BALL AND T. OFFICER.
ROCK DRILL.
APPLICATION FILED AUG. 13, 1915.
1,304,523.
Patented May 20, 1919.
3 SHEETS—SHEET 3.
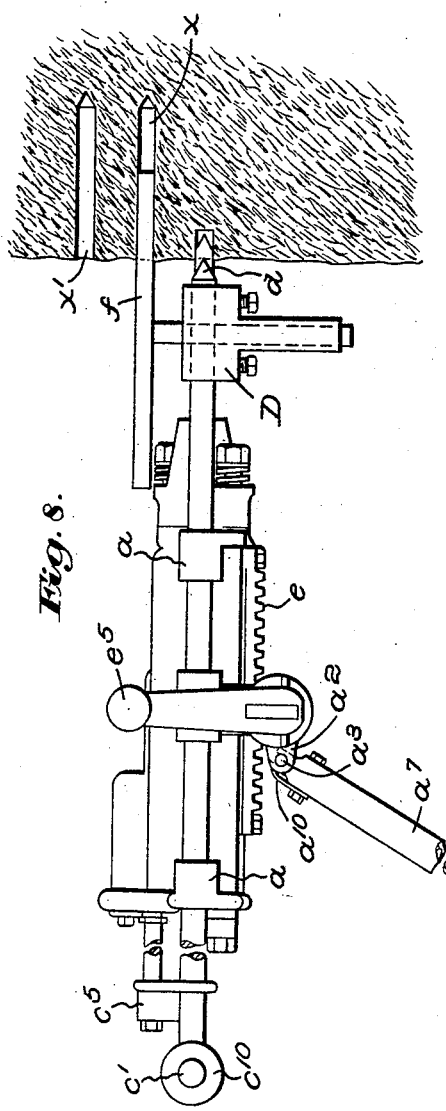
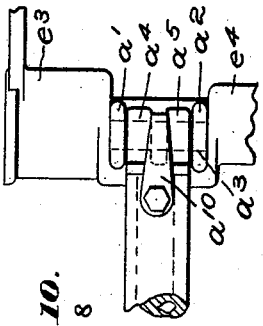
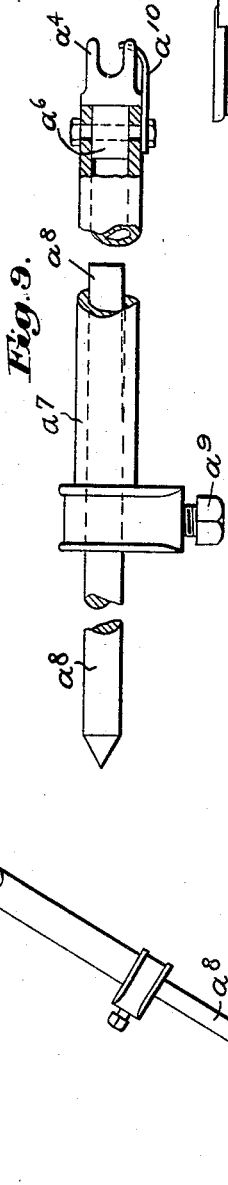
Inventors:
Albert Ball,
Thomas Officer,

UNITED STATES PATENT OFFICE.

ALBERT BALL AND THOMAS OFFICER, OF CLAREMONT, NEW HAMPSHIRE, ASSIGNORS TO SULLIVAN MACHINERY COMPANY, OF CLAREMONT, NEW HAMPSHIRE, A CORPORATION OF MASSACHUSETTS.

ROCK-DRILL.

1,304,523.      Specification of Letters Patent.      Patented May 20, 1919.

Original application filed July 26, 1904, Serial No. 218,300. Divided and this application filed August 13, 1915. Serial No. 45,393.

*To all whom it may concern:*

Be it known that we, ALBERT BALL and THOMAS OFFICER, citizens of the United States, and residents of Claremont, New Hampshire, have invented an Improvement in Rock-Drills, of which the following description, in connection with the accompanying drawings, is a specification, like characters on the drawings representing like parts.

Our invention consists in improvements in rock drills, the specific form thereof here shown being particularly intended for use in what is known as "plug and feather" work, although, as will be obvious, our said invention has many features applicable to drills of other types and employed for other uses.

This application is a division of our copending application filed July 26, 1904, Serial No. 218,300, now Patent No. 1,176,708, Mar. 21, 1916, being directed to the disclosure of the parent application in which the drill is self sustained, as distinguished from being balanced on the points —d—d— by the hand of the operator as in Figures 1 and 4. The claims herein presented are all readable on Fig. 8 of the drawings wherein the part *f* serves as one form of support parallel with the axis of the drill, but offset therefrom. The present application pertains to supporting rather than gaging and the specific drill frame structure claimed in the parent application has no bearing on the present application. In this connection no orientation of the various parts relative to the supporting points or rods is necessary, the only relevant orientation being relative to the axis of the drill cylinder, since it is this orientation which determines whether or not the parts are supports.

In "plug and feather" work it is usual to drill rows of holes, the holes of any one row being ordinarily equally spaced, and since these holes are frequently of comparatively shallow depth, the work of transferring the drill from a hole already drilled to a position for drilling the next hole and of adjusting it in its new position, frequently occupies as much or more time than the actual drilling of the holes. One object of our invention is to provide a rock drill which is not only an efficient drilling machine, but which is susceptible of quick and easy handling and rapid adjustment, so as to reduce to a minimum the time required for transference from one hole to another while at the same time providing for the greatest certainty of control, convenience of manipulation and accuracy of work.

Our invention will be best understood from the following description, when taken in connection with the accompanying illustration of one specific embodiment thereof, while its scope will be more particularly pointed out in the appended claims.

In the drawings:—

Fig. 1 is an elevation of the illustrated form of our invention looking from the front or operator's side of the drill;

Fig. 2 is a side elevation of the same;

Fig. 3 is a plan view;

Fig. 4 is a detail in plan of the foot-rest;

Fig. 5 is a rear view of the drill, or one taken from the side opposite the operator;

Fig. 6 is a sectional detail taken through the controlling valve;

Fig. 7 is a section on the line 7—7 in Fig. 5;

Fig. 8 is a view showing the mode of employing our invention in drilling into vertical walls;

Figs. 9 and 10 are details showing the vertical support;

Fig. 11 shows a modified form of rack; and

Figs. 12, 13 and 14 show modifications of the gage.

Referring to the drawing, the cylinder A is provided at each end with a pair of laterally extending ears *a* which serve to connect the engine cylinder and the drill tool with the two supporting frame rods *b*, *b*, and, being slidable thereon, permit the cylinder with the drill tool to be moved or fed upon said frame rods to and from the work through the feeding mechanism hereinafter described. At the opposite, or tool end, said frame rods are tied or secured together (Figs. 1 and 6) by the holding member *c* which herein constitutes a drill positioning grasping device and consists of a hollow casting, into which the ends of the rods are threaded and so located as to be easily but firmly grasped by the hand of the person operating the drill. The holding member $c$ is provided with suitable conduits for receiving the supply of fluid under pressure, herein assumed to be air, and with suitable drill controlling means for controlling the operation of the drill, such controlling means herein comprising the rotary hand valve $c'$, so located as to be conveniently manipulated by the thumb and finger of that hand grasping the said holding member $c$ and without the necessity of relieving the grasp thereupon. During the operation of the drill the air is supplied through suitable and preferably flexible connection from the source of supply (not shown), to the mouth $c^2$ (Fig. 6) of the holding member and, passing through the valve controlled passage $c^3$, enters the depending leg, $c^4$, and into a chamber (Figs. 1 and 5) in the offset portion $c^5$ thereof. Thence it passes through a stationary pipe $c^6$ secured in the offset portion $c^5$ to the air chamber $c^7$ of the engine cylinder. In entering the air chamber $c^7$ the tube $c^6$ passes through a suitable stuffing box $c^8$ and is extended into the air chamber to a sufficient length to permit the necessary movement of the cylinder to take place along the rods $a, a$, during the feeding of the drill.

The controlling valve herein shown consists of a tubular valve member $c^9$ having a portion of its walls cut away as shown, whereby when the valve is rotated through the medium of the handle $c^{10}$ the supply of air may be varied or cut off, as desired. A suitable packing nut $c^{11}$ is provided to prevent leakage about the valve stem. The form of valve shown permits an efficient seating of the valve when closed, since the supplied pressure itself is exerted to enforce the seating of the valve when turned to the cut-off position.

The lower end of the frame, instead of resting upon the usual self-supporting tripod or frame, is, in the embodiment of our invention here shown, provided with two supporting points $d, d$, adjustably secured to the foot-plate D, and herein in axial alinement with the frame rods $b, b$, the ends of the latter being also adjustably secured to the said foot-plate D, by which they are rigidly held together at their lower ends. These points are preferably sharpened and of hardened steel. When dulled, they may be readily removed and resharpened. The foot-plate D is provided with a foot-holding member $d^2$ arranged at the side of the drill tool to be pressed downwardly by the foot of the operator and also with a foot-guard $d^3$, which permits foot pressure effectively to be applied closely adjacent the axis of the drill, precluding, however, all possible injury to the foot of the operator.

When in use the drilling machine rests upon the two supporting points, $d, d$, these being firmly pressed into contact with the surface of the rock through the foot pressure of the operator upon the foot-hold $d^2$. The operator with one hand employed in feeding the drill, can with his other hand, manipulate the controlling valve, at the same time firmly grasping the holding member $c$ to steady the drill or to give it proper alinement by rocking it about the supporting points $d, d$. By relieving the pressure of the foot, the supporting points $d, d$, may be shifted slightly to any desired degree through the hand grasping the holding member, or, the drill may be quickly lifted and moved bodily to any desired location,— which may be that suitable for drilling the next hole. The location of the holding member which is preferably substantially in the central plane of the drill and at or near the end of the supporting frame, enables the operator through its use to handle and move the entire machine quickly and easily, while the location of the foot-holding member $d^2$ transmits the foot pressure directly to the holding points, avoiding any displacement of the drill when its location has been determined upon.

In place of the screw feeding mechanism usually employed upon rock drills, we have here shown a novel form of drill feeding mechanism. Referring particularly to Figs. 1, 2, 3 and 7, the body of the sliding cylinder is provided with a longitudinally arranged rack $e$, engaging with a pinion $e'$ upon the shaft $e^2$, journaled in the hangers $e^3$ and $e^4$, which are rigidly but adjustably clamped to the side supporting rods $b$ as by set screws, shown at $e^x$ in Fig. 7. Rotation of the gear $e'$ and the feeding of the cylinder and drill tool on the supporting rods, is effected by rotation of a feed actuating member, herein the handle $e^5$, which is secured to the rectangular end $e^6$ of the shaft $e^2$.

The rack and pinion feeding mechanism described permits a very rapid feed to be effected with comparatively slight movement of the hand, and since the principal component of the hand pressure effecting the feeding movement is in a plane, substantially parallel with the drill tool, and with the supporting frame and the foot pressure applied to hold it in position, such feeding pressure does not affect the stability of the structure when in use or the operators' control over it; on the contrary, the downward movement of the hand tends to assist the foot pressure, while the upward movement of the hand is insufficient to affect it. Neither movement tends materially to upset the equilibrium of the drill. Moreover, the position of the feed actuating member, which is intermediate the holding member and the drill tool, is such as to permit the operator to employ the same in coöperation with the holding member c at the top of the supporting frame in manipulating the drill support, whether in placing it in position, in holding it while in use, or in transferring it from one point to another.

The described connections between the drill feeding member and the drill tool would, if no provision were made, permit a reverse feeding movement of the drill and the transmission to the handle $e^5$ of the shock or concussion as the drill strikes the rock. To relieve the operator of this shock or concussion and to oppose any reverse movement of the drill, there is provided frictional locking means adapted to oppose movement of the gear $e'$ when the operator so desires. To this end the handle $e^5$ is pivoted at $e^7$ upon the rectangular portion of the shaft $e^2$, whereby an outward lateral movement of the handle $e^5$ (Figs. 3 and 7) about its pivot, causes a lug $e^8$ thereon, to engage a friction plate $e^9$ interposed between the hub of the handle and the hanger $e^4$, causing the latter frictionally to press against the face $e^{10}$ of said hub. At the opposite end of the shaft $e^2$ is a friction washer, $e^{11}$, of leather or other suitable material, which is held upon the shaft against the face of the hanger $e^3$ by means of a washer and lock nut $e^{12}$. When the operator moves the handle $e^5$ laterally, to force the washer $e^9$ against the hanger $e^4$, the shaft $e^2$ is drawn through its journals, compressing the friction washer $e^{11}$ between the outer washer and the hanger $e^3$, thereby to produce an efficient frictional resistance to the movement of the gear $e'$, which resistance may be varied at will by the force applied in the lateral movement of the handle. The leverage being great, the gear may be efficiently locked and the operator relieved from the shock of the blow by a slight lateral movement of the handle $e^5$. A spring $e^{13}$ is employed between the handle and the shaft $e^2$, tending normally to maintain the former out of its friction position.

In Fig. 11 we have shown a modified form of rack which is provided with skewed or spirally cut teeth, and intended to be employed with a similarly cut pinion. This may be employed, if desired, to assist in preventing retrograde movement of the tool during feeding, and obviously may be employed as the sole locking means or in connection with the friction device described or other like devices.

While we prefer to employ a toothed feeding device, such as one of the illustrated racks with its pinion, obviously other feeding devices may be employed to obtain certain advantages of our invention and are to be understood to be within the scope of the same.

When desired, the drill feed, which, of course, is limited by the length of the rack e, may be lengthened by unclamping the hangers $e^3$ and $e^4$, and adjusting them relatively on the support to a new position; thus changing the limit of the drill feed upon the support.

In using a drill for "plug and feather" work, the rapidity of the work is greatly increased by the employment of means which assist in locating and positioning the drill with reference to a hole already drilled when it is transferred to another position for drilling the next hole.

Referring particularly to Figs. 1 to 4 and 5, we have shown adjustably attached to the foot-plate D a T-shaped gage or spacing device $f$, the arms of which are adjustably held substantially parallel with the drill tool, the depending arm of the gage being adapted to enter and engage the walls of a hole already drilled to position the drill tool for the undrilled hole, whereby the latter may be drilled with a predetermined relation to the preceding hole and with all previously drilled holes, if desired. The gage $f$ is adjustably held by the set screw $f'$ in the foot-plate D, and may be placed in the same plane with the supporting points $d$ and the drill tool itself, as shown in the full line position in Fig. 4. By adjusting the space between the drill tool and the gage, the space between the drilled holes may be definitely fixed for any desired number of holes. The foot-plate D is arranged to receive the shank of the gage, as shown in Fig. 4, in either of two holes 1 and 2, so that it may be adjustably held in either of two planes intersecting at the axis of the drill tool, the dotted line position showing it located in a plane at right angles to the plane of the supporting points.

When any predetermined spacing of the holes is desired, the gage is set to that distance and no marking of the holes is required beyond a mere indication of where the line of drilled holes should be. The first hole may be drilled near the edge of the stone by placing the gage against the edge, thus holding it at a fixed distance, the drill being subsequently positioned for the remaining holes by inserting the depending arm of the gage in each instance in the previously drilled hole. The spacing gage not only definitely fixes the distance of the holes apart, but since it enters the previously drilled hole, it may also assist the operator to some extent in holding the drill plumb and in position, particularly, if the gage extends any distance into the hole or has an approximate fit in the hole, and particularly when used as shown in the dotted line position, Fig. 4. It moreover greatly assists the operator in quickly positioning the drill, since after insertion of the gage in the previously drilled hole, the operator is only obliged to move the drill about the gage as a center until the position of the tool upon the line is found and this can readily be done.

The spacing gage is shown as T-shaped in order to permit a single gage to be used in any of its several possible positions relatively to the drill. Obviously, where but one of these positions is to be employed, an L-shaped gage could be used with equal facility, but with the T-shaped gage shown, the same gage may be used in the two positions shown in Fig. 4, and also in the reverse of those two positions.

In Figs. 8, 9 and 10 we have illustrated the method of employing the above-described drill for drilling holes in an upright wall, such as the side wall of a quarry or the side face of a block instead of a horizontal surface, such as is afforded by a quarry floor or the top face of a block. For this purpose the hangers $e^3$ and $e^4$, (Fig. 10) may be and preferably are provided with the ears $a'$ and $a^2$. These ears (Fig. 8) extend rearwardly (upwardly) and carry the fixed pin $a^3$. When the drill is to be employed in a horizontal or approximately horizontal position for drilling holes in an upright wall, the pin $a^3$ is adapted to rest in the U-shaped fingers $a^4$ and $a^5$ formed upon a plug $a^6$. The latter is bolted or otherwise rigidly secured to the end of the barrel section $a^7$ of a telescopic supporting leg, the sliding section $a^8$ of which is adapted to be secured in any desired extended position by the set screw $a^9$. A guard spring $a^{10}$ is secured to the end of the barrel section $a^7$, and adapted to overlie the pin $a^3$, when the leg is in use, and is preferably of such strength and shape as to retain the leg in its attached position against slight disturbances or against the depending weight of the leg itself when the drill is lifted, but permitting, however, the ready withdrawal of the leg from the pin when the operator for purposes of disengagement intentionally gives the leg a longitudinal pull.

When the drill is to be employed for the purpose suggested, the leg having been attached, the drill is placed with its points $d$ resting against the upright face of the rock to be drilled and the leg $a^7$ inclined at any suitable angle. The elevation of the drill may be quickly adjusted within certain limits by merely hitching or forcing the leg forward or backward to change its angle of inclination, and obviously adjustment outside of these limits may be effected by lengthening the telescopic joint. The weight of the drill acting against the inclined leg tends to seat the points $d$ firmly upon the face of the rock, and this is greatly assisted by the effort of the operator, which can be readily applied, owing to the relative arrangement of the controlling devices. In drilling vertical rows of holes, however, the spacing gage $f$ acts, in addition to its function as a spacing device, to engage the walls of the previously drilled hole and thereby effectively to assist in supporting the drill and in holding it in its selected alinement and to supplement the horizontal support afforded by the leg $a^7$. This is best illustrated by reference to Fig. 8, where the gage $f$ inserted in the drill hole $x$, acts as a hanger to carry a portion of the weight of the drill, causing the latter to cling to the face of the rock. In coöperation with the points $d$ and also with the leg $a^7$, it acts to hold the same firmly in alinement and fixed relation to the work.

In Figs. 12, 13 and 14 there is shown a modified form of gage which will materially assist in locating the drill on change of position and in alining the drill after being located. In place of the comparatively short shank of the gage $f$, but removably held in the foot plate D in like manner, the bar $m$, of any desired length, may be employed on which may be adjustably secured, as by set screws, the sleeves $m'$ and $m^2$ carrying respectively the downwardly turned gage points $m^3$ and $m^4$, the same being viewed in plan in Fig. 12 and side elevation in Fig. 13.

The sleeves $m'$ and $m^2$ being adjusted to separate the gage points by the predetermined distance between drilled holes, and the point $m^3$ being at a like distance from the drill, the location of which is indicated at $m^5$, both the location and alinement of the drill is materially assisted after the drilling of the second hole of a series, and particularly where the gage points fit closely in the drilled holes; for, if the operator on completing one hole shifts the drill to bring the gage point $m^2$ into the freshly drilled hole and the point $m^3$ into the hole previously occupied by point $m^2$, the drill tool will be correctly positioned and alined for the next hole to be drilled. Obviously the bar $m$ may be suitably proportioned and of any desired length and any number of gage points may be used.

This form of gage described may be effectively used in drilling upright walls, for, by inserting the second gage point (Fig. 8) in the second hole $x'$ above the drill tool, the drill will receive support therefrom as well as from the point within the hole $x$, as shown in Fig. 8, and the drill tool by this arrangement will be alined the same as when employed in a vertical position.

The above gage may be modified to permit the drilling of a row of holes in the arc of a circle and this without the necessity of any circular marking upon the face of the stone. This may be accomplished by substituting for the point $m^3$, which (Fig. 12) is fixedly secured to the sleeve $m'$ and in line with the drill tool and point $m^4$, the point $m^{3\times}$ (shown in side elevation in Fig. 14) which is adjustably secured to the arm $m^6$, extending laterally from the sleeve $m'$, so that the point $m^{3\times}$ may be set out of alinement with the drill tool and the point $m^4$. Under these conditions the relative position of the drill tool, point $m^{3\times}$ and point $m^4$ determine the radius of the circle which the described use of the drill will cause the successively drilled holes to follow. This radius may be varied by varying the position of the point $m^{3\times}$ on its arm $m^6$ and the latter may, if desired, be gaged to indicate the circle corresponding to the position of the point $m^{3\times}$ thereon.

The construction of the engine itself forms no material part of our present invention, but is more particularly described and claimed in our Patent No. 842,127, issued Jan. 22, 1907.

We here deem it unnecessary to refer to the various modifications in form, details and arrangement of parts which may be made in the form of our invention here disclosed and which will be obvious to those skilled in the art; nor do we deem it necessary to refer to the various obvious applications which may be made of our invention other than those here referred to, but have in accordance with the requirements, illustrated our broad invention by a single specific embodiment thereof and a single particular application.

Claims:

1. A mining machine comprising in combination, a drill bit, a cylinder, a fluid actuated piston reciprocable in said cylinder for imparting drilling power to said drill bit, a pivotal support eccentric with said drill bit and disposed in a generally horizontal direction parallel with the axis of said cylinder, offset means operatively connecting said support with said cylinder whereby a predetermined eccentricity may be maintained while permitting arcuate movement of said drill relative to said support.

2. Drilling apparatus comprising a rock drill, a clamp for mounting said rock drill in alinement with the aperture to be drilled, said clamp being connected to a drill support having an axis disposed in a generally horizontal direction substantially parallel with the axis of said rock drill whereby said rock drill may be swung in a direction at right angles to its longitudinal axis to move the drill out of alinement with the drilled aperture while maintaining the parallel relation of the axis of said rock drill to the drilled aperture.

3. Drilling apparatus comprising in combination, a pressure fluid actuated drill having a cylinder with a piston reciprocable therein, a drill steel substantially alined with the axis of said cylinder, a drill support comprising a pivot member disposed in a generally horizontal direction and eccentric with said drill steel and substantially parallel therewith, drill feeding means for advancing said drill cylinder in line with its axis relative to said support and an offset member operatively connecting said drill with said support whereby said drill may be freely swung about the axis of said support, clear of the drill bit to facilitate change of the latter while maintaining a substantially parallel relation with the drilled hole.

In testimony whereof, we have signed our names to this specification, in the presence of two subscribing witnesses.

ALBERT BALL.
THOMAS OFFICER.

Witnesses:
LEON GILMAN,
H. DURWARD, Jr.